(12) United States Patent
Ebisawa (10) Patent No.: US 10,235,801 B2
(45) Date of Patent: Mar. 19, 2019

(54) METHOD FOR ADJUSTING COMFORT LEVEL OF HELMET AND INFORMATION PROCESSING APPARATUS FOR ADJUSTMENT

(71) Applicant: SHOEI CO., LTD., Tokyo (JP)

(72) Inventor: Takashi Ebisawa, Tokyo (JP)

(73) Assignee: SHOEI CO., LTD., Tokyo (JP)

( * ) Notice: Subject to any disclaimer, the term of this patent is extended or adjusted under 35 U.S.C. 154(b) by 0 days.

(21) Appl. No.: 15/488,175

(22) Filed: Apr. 14, 2017

(65) Prior Publication Data

US 2017/0301131 A1    Oct. 19, 2017

(30) Foreign Application Priority Data

Apr. 15, 2016    (JP) ................................ 2016-081623

(51) Int. Cl.
| | |
|---|---|
| *G06T 19/20* | (2011.01) |
| *G06T 17/10* | (2006.01) |
| *A42B 3/12* | (2006.01) |
| *A42C 2/00* | (2006.01) |

(52) U.S. Cl.
CPC .............. *G06T 17/10* (2013.01); *A42B 3/125* (2013.01); *A42C 2/007* (2013.01); *G06T 19/20* (2013.01); *G06T 2219/2004* (2013.01); *G06T 2219/2012* (2013.01)

(58) Field of Classification Search
CPC ..................................................... A42C 2/007
See application file for complete search history.

(56) References Cited

U.S. PATENT DOCUMENTS

| | | | |
|---|---|---|---|
| 9,545,127 B1* | 1/2017 | Sandifer ................ | A42B 3/121 |
| 2004/0163228 A1* | 8/2004 | Piorkowski ............ | A42C 2/007 |
| | | | 29/407.04 |
| 2006/0101559 A1 | 5/2006 | Moore, III et al. | |
| 2013/0158949 A1 | 6/2013 | Ebisawa | |
| 2014/0201889 A1 | 7/2014 | Pietrzak et al. | |
| 2015/0055085 A1* | 2/2015 | Fonte ................ | G06Q 30/0621 |
| | | | 351/178 |

FOREIGN PATENT DOCUMENTS

| | | |
|---|---|---|
| EP | 0957697 A1 | 11/1999 |
| JP | 5814773 B2 | 11/2015 |

OTHER PUBLICATIONS

Extended European Search Report in EP Application No. 17161621.2, dated Aug. 22, 2017, 6pp.
Office Action in EP Application No. 17161621.2, dated May 22, 2018, 4pp.
Office Action in EP Application No. 17161621.2, dated Dec. 17, 2018, 4pp.

* cited by examiner

*Primary Examiner* — Ryan McCulley
(74) *Attorney, Agent, or Firm* — Hauptman Ham, LLP (57) ABSTRACT

A method for adjusting the comfort level of a helmet includes the steps of acquiring head shape data by measuring a three-dimensional shape of a head of a wearer of a helmet, inputting inner surface shape data showing a three-dimensional shape of a helmet inner surface, acquiring space information showing a space between the head and the helmet inner surface on the basis of the head shape data and the inner surface shape data, and displaying additional images showing the space information on a display part by superimposing the additional images on i) a shape image showing the inner surface shape data or ii) the shape image showing the head shape data and the inner surface shape data.

12 Claims, 12 Drawing Sheets

METHOD FOR ADJUSTING COMFORT LEVEL OF HELMET AND INFORMATION PROCESSING APPARATUS FOR ADJUSTMENT

CROSS-REFERENCE TO RELATED APPLICATIONS

The present application claims priority to Japanese Patent Application number 2016-081623, filed on Apr. 15, 2016. The content of this application is incorporated herein by reference in its entirety.

BACKGROUND OF THE INVENTION

The present invention relates to a method for adjusting a comfort level of a helmet and an information processing apparatus for the adjustment.

Helmets are worn by riders of bicycles and motorcycles for the purpose of protecting their heads. The helmets are usually classified according to predetermined sizes, but a shape of a head of a wearer who wears the helmet is different for each wearer. Therefore, for example, when a wearer purchases a helmet, the wearer measures a circumferential length of his/her head and selects a helmet of a suitable size that matches their head.

However, while an inner surface of the helmet has a uniform shape (for example, an elliptical shape), the head of the wearer has an irregular shape unlike the inner surface shape of the helmet. Accordingly, the wearer's head is compressed, or a gap appears between the inner surface of the helmet and the wearer's head, and so the wearer finds the helmet uncomfortable. Therefore, for example, a head size measuring tool disclosed in Japanese Patent No. 5814773 is known as a measuring tool for measuring a head. In Japanese Patent No. 5814773, the front-to-rear length, the right-and-left width, and the upper-head-height of a wearer's head are measured by the head size measuring tool to select a pad for filling the gap between an inner surface of the helmet and the wearer's head.

However, because the head size measuring tool disclosed in Japanese Patent No. 5814773 measures a predetermined point of a head, shapes of other areas cannot be comprehended. That is, a complicated shape of a whole head cannot be comprehended. As a result, an adjustment of a helmet to fit over the whole head is difficult. That is, a helmet that is truly comfortable for a wearer cannot be realized.

BRIEF SUMMARY OF THE INVENTION

This invention focuses on these points, and an object of the invention is to provide an adjustment method for obtaining a helmet with a comfortable feeling that is suitable for a complicated head shape of a wearer.

In one aspect of the present invention, a method for adjusting a comfort level of a helmet that comprises the steps of acquiring head shape data by measuring a three-dimensional shape of a head of a wearer of a helmet, inputting inner surface shape data showing a three-dimensional shape of a helmet inner surface, acquiring space information showing a space between the head and the helmet inner surface on the basis of the head shape data and the inner surface shape data, and displaying additional images showing the space information on a display part by superimposing the additional images on i) a shape image showing the inner surface shape data or ii) the shape image showing the head shape data and the inner surface shape data is provided.

DETAILED DESCRIPTION OF THE INVENTION

<1. Outline of a Helmet>

Figure 1:
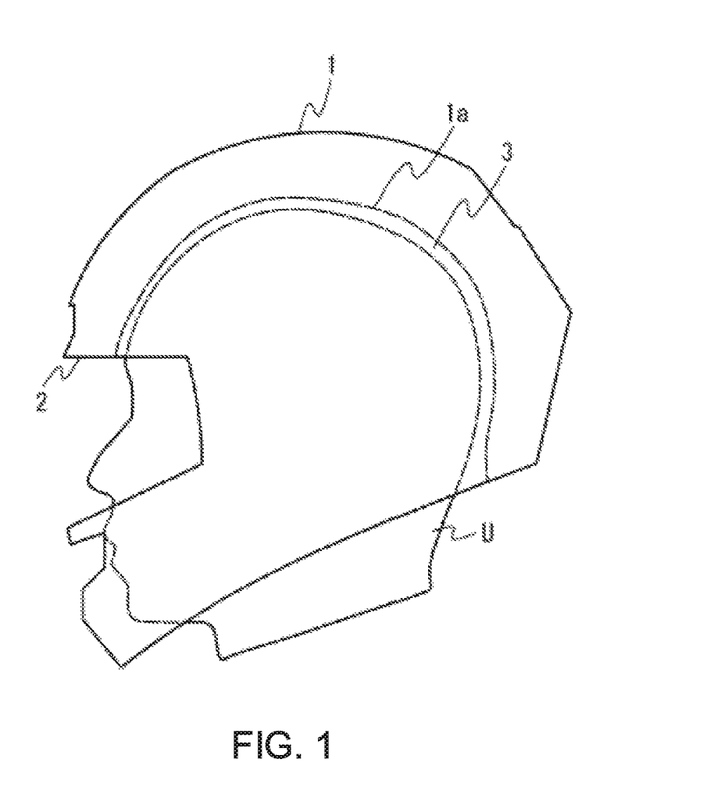
FIG. 1 is a schematic view showing a helmet 1 worn by a wearer U.
Figure 2:
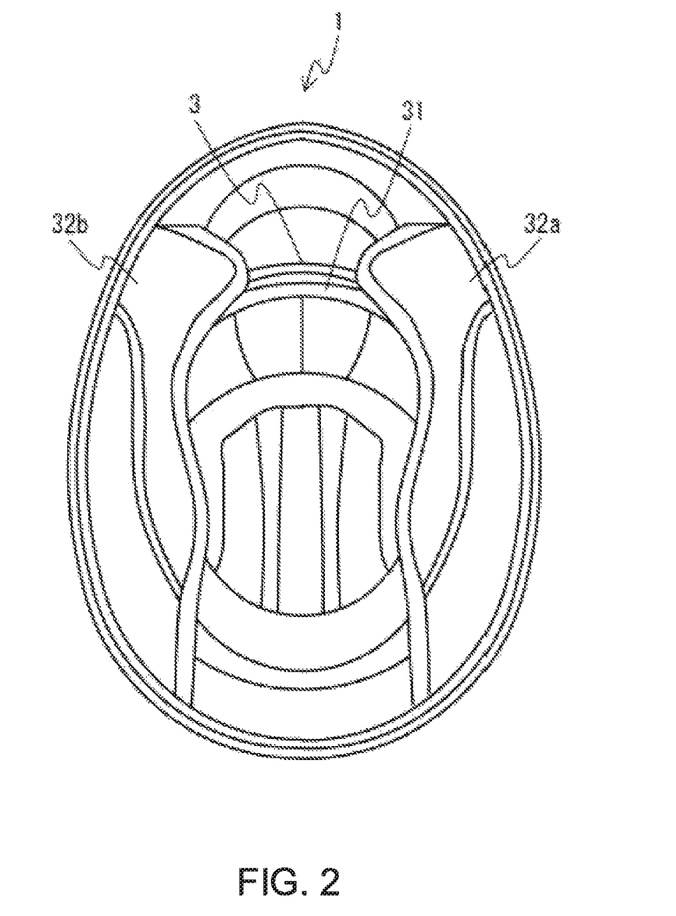
FIG. 2 is a diagram of the helmet 1 as viewed from below.

An outline of a helmet 1 according to one exemplary embodiment of the present invention is described with reference to FIGS. 1 to 3. FIG. 1 is a schematic view showing the helmet 1 worn by a wearer U. FIG. 2 is a diagram of the helmet 1 as viewed from below.

Here, the helmet 1 is a full-face-type helmet worn by the wearer U who is a motorcycle rider and protects the head of the wearer U. The helmet 1 is classified into predetermined sizes (for example, S-size, M-size, L-size, or the like) in advance. As shown in FIG. 1, the helmet 1 has a front opening 2 and an inner pad 3.

The front opening 2 is an opening part so that the wearer U wearing the helmet 1 can ensure a forward visual field. A shield that covers the front opening 2 may be detachably attached to the front opening 2.

The inner pad 3 is attached to the helmet inner surface 1a. Specifically, the inner pad 3 is attached to a part of the helmet inner surface 1a that is in contact with the head of the wearer U. The inner pad 3 has a function of making the head of the wearer U be in close contact with the helmet inner surface 1a.

Figure 3:
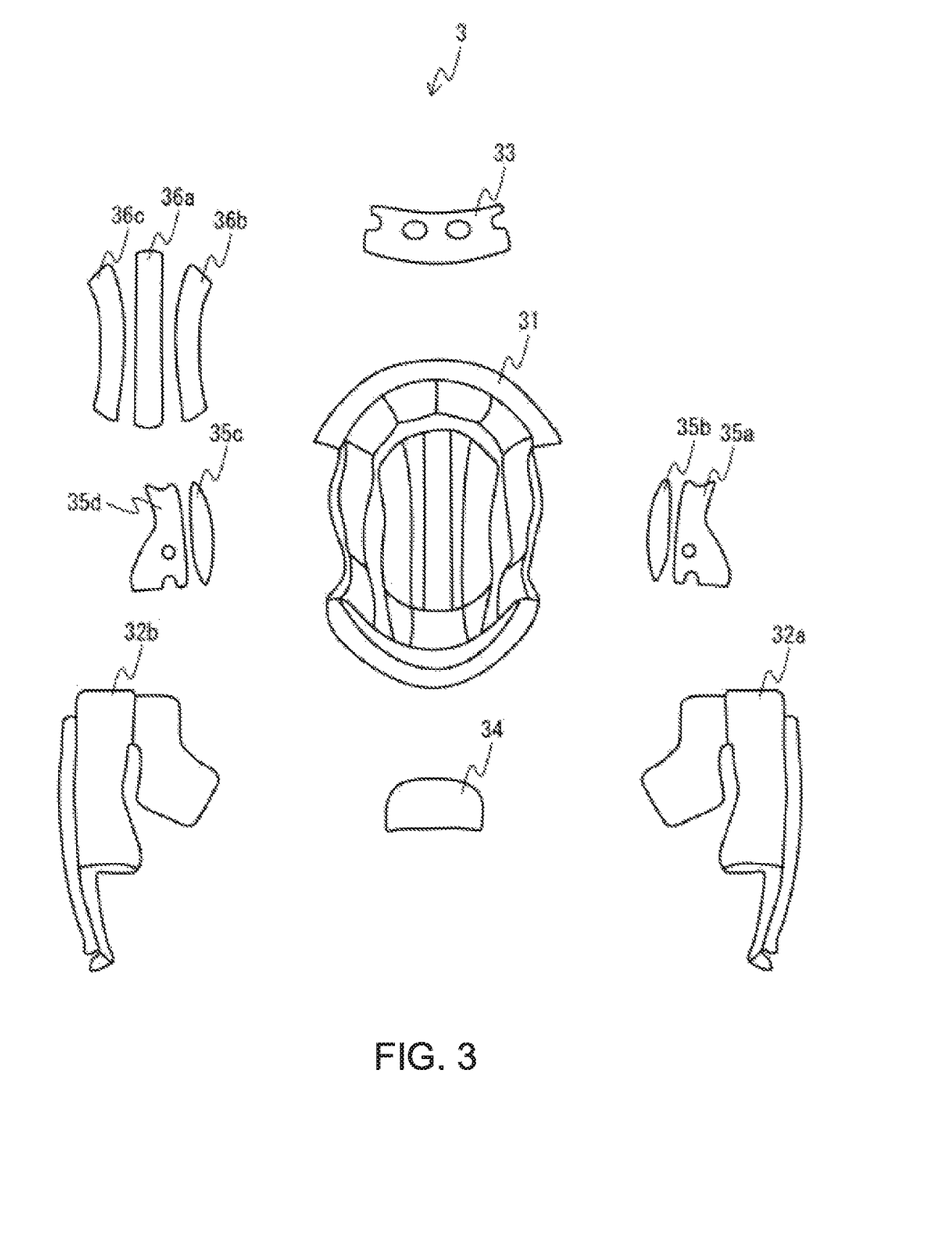
FIG. 3 is a diagram showing an example of a configuration of an inner pad 3.

FIG. 3 is a diagram showing an example of a configuration of the inner pad 3. The inner pad 3 includes a plurality of pads. Specifically, as shown in FIG. 3, the inner pad 3 includes a center pad 31, cheek pads 32a and 32b, and additional pads 33, 34, 35a to 35d, and 36a to 36c.

The center pad 31 is a pad that covers from a forehead to a back of the head of the wearer U. The center pad 31 is prepared in accordance with the size of the helmet 1. The cheek pads 32a and 32b are a pair of pads that hold right and left cheeks of the wearer U.

The additional pads 33, 34, 35a to 35d, and 36a to 36c are pads that are additionally attached for adjusting the thickness of the inner pad 3. The additional pads 33, 34, 35a to 35d, and 36a to 36c are arranged between the outer surface of the center pad 31 and the helmet inner surface 1a. The additional pads 33, 34, 35a to 35d, and 36a to 36c are attached to the outer surface of the center pad 31 by, for example, a gluing agent, an adhesive, an adhesive tape, or the like. Further, the attachment sites of the additional pads 33, 34, 35a to 35d, and 36a to 36c in the helmet inner surface 1a are predetermined.

It should be noted that the helmet inner surface 1a is formed in accordance with the average shape of the head of a general wearer according to statistics. On the other hand, the head of an actual wearer may have a shape that is significantly different from the average shape. Therefore, a space between the helmet inner surface 1a and the wearer's head differs depending on a part of the head. The details will be described later, but in the present exemplary embodiment, the space information is obtained on the basis of head shape data showing a three-dimensional shape of the wearer's head who actually wears the helmet 1 and inner surface shape data that shows a three-dimensional shape of the helmet inner surface 1a, and an additional image showing the space information is displayed on the display part 13 by being superimposed on a shape image. As a result, an operator who adjusts a comfort level of the helmet 1 can easily comprehend the space (gap) between the whole head of the wearer and the helmet 1 with high accuracy.

<2. Configuration of an Information Processing Apparatus for Adjusting the Comfort Level of a Helmet>

A configuration of an information processing apparatus 10 for adjusting the comfort level of a helmet according to one exemplary embodiment of the present invention is described with reference to FIG. 4.

Figure 4:
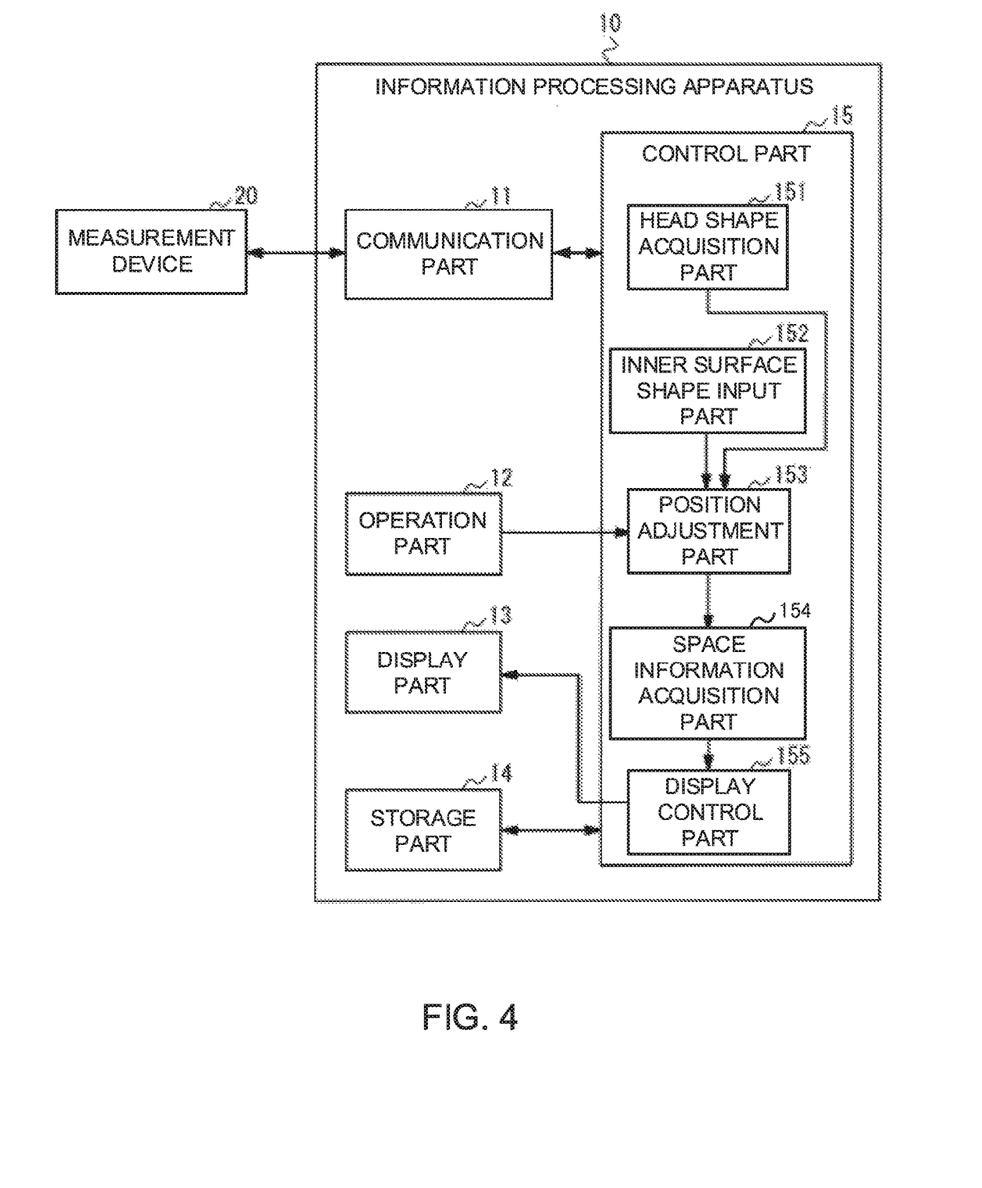
FIG. 4 is a block diagram showing an example of a configuration of an information processing apparatus 10 for adjusting a comfort level of a helmet.

FIG. 4 is a block diagram showing an example of a configuration of the information processing apparatus 10 for adjusting the comfort level of a helmet. The information processing apparatus 10 is installed in, for example, a dealer that sells the helmet 1, and an operator such as a shop assistant operates the apparatus so as to adjust the helmet 1 according to the shape of the head of the purchaser of the helmet 1. As shown in FIG. 4, the information processing apparatus 10 includes a communication part 11, an operation part 12, a display part 13, a storage part 14, and a control part 15.

The communication part 11 is a communication interface (hereafter, communication IF) that communicates with an external device. The communication part 11 communicates with a measurement device 20 such as a 3D scanner and transmits and receives information. For example, the communication part 11 performs wireless or wired communication with the measurement device 20 and receives measurement data measured by the measurement device 20.

The operation part 12 includes, for example, a keyboard, a mouse, or the like. The operator performs an input operation using the operation part 12 when, for example, the helmet 1 is adjusted.

The display part 13 includes, for example, a liquid crystal display, an organic electro-luminescence display, or the like. The display part 13 displays the measurement data of the measurement device 20. Further, the display part 13, whose details will be described later, displays the space information between the helmet 1 and the wearer's head as an additional image.

The storage part 14 includes, for example, a ROM, a RAM, or the like and stores various programs to be executed by the control part 15 and various data. For example, the storage part 14 stores the measurement data measured by the measurement device 20.

The control part 15 includes, for example, a CPU. The control part 15 controls the operation of the information processing apparatus 10 by executing the various programs stored in the storage part 14. In the present exemplary embodiment, the control part 15 functions as a head shape acquisition part 151, an inner surface shape input part 152, a position adjustment part 153, a space information acquisition part 154, and a display control part 155.

[Head Shape Acquisition Part 151]

The head shape acquisition part 151 acquires the head shape data showing the three-dimensional shape of the wearer's head of the helmet 1. Specifically, the head shape acquisition part 151 acquires the head shape data that is the measurement data obtained by the measurement device 20 measuring the three-dimensional shape of the wearer's head. The head shape acquisition part 151 generates a head shape image from the obtained head shape data, and outputs the head shape image to the position adjustment part 153.

Here, the measurement device 20 is a non-contact-type 3D scanner. For example, the measurement apparatus 20 acquires the three-dimensional shape of the wearer's head by analyzing the time difference and the irradiation angle of a light beam that is applied and reflected against the head of the wearer U. It should be noted that the 3D scanner is not limited to a light scanner, and it may adopt, for example, a method of taking a picture. Further, the measurement device 20 is the 3D scanner in the above description, but it is not so limited and the measurement device 20 may be other apparatuses as long as the measurement device 20 can measure the wearer's head.

Figure 5:
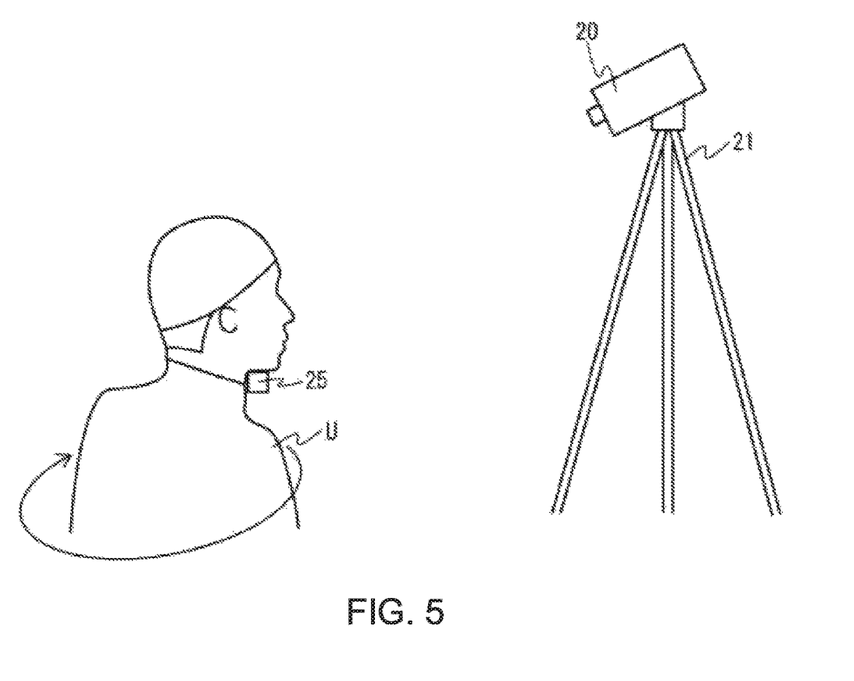
FIG. 5 is a schematic view for describing a method for measuring a three-dimensional shape of a head of the wearer U using a measurement device 20.

FIG. 5 is a schematic view for describing a method for measuring the three-dimensional shape of the head of the wearer U by the measurement device 20. The measurement device 20 is separated from the head of the wearer U as shown in FIG. 5 and measures the head covered with a hair cap. During a measurement, the wearer U sits on a rotary table (not shown in figures) and maintains a state where his/her jaw is placed on a support rod 25. Then, the measurement device 20 that is fixed to a support leg 21 measures the head of the wearer U while the wearer U is rotated in a direction of the arrow in FIG. 5 by the rotary table. As a result, the three-dimensional shape of the head of the wearer U can be accurately measured.

[Inner Surface Shape Input Part 152]

Inner surface shape data showing the three-dimensional shape of the inner surface of the helmet 1 is inputted to the inner surface shape input part 152. Specifically, the inner surface shape data obtained by the measurement device 20 measuring the three-dimensional shape of the helmet inner surface 1a is inputted to the inner surface shape input part 152. The inner surface shape input part 152 generates an inner surface shape image from the inputted inner surface shape data and outputs the inner shape image to the position adjustment part 153.

During a measurement of the three-dimensional shape of the helmet inner surface 1a, the measurement device 20 measures the three-dimensional shape of the helmet inner surface 1a from the bottom surface side of the helmet 1. During this measurement, the inner pad 3 is not attached to the helmet 1. In such a manner, the measurement device 20 measures the three-dimensional shape of the helmet inner surface 1a in addition to the three-dimensional shape of the wearer's head. In this way, the actual three-dimensional shape of the helmet inner surface 1a can be obtained with high accuracy.

It should be noted that, in the above description, the inner surface shape data obtained by the measurement device 20 measuring the three-dimensional shape of the helmet inner surface 1a is inputted to the inner surface shape input part 152, but it is not so limited. For example, the inner surface shape data may be extracted from design data of the helmet 1 and may be inputted to the inner surface shape input part 152. In such a case, a measurement by the measurement device 20 is not necessary.

[Position Adjustment Part 153]

The position adjustment part 153 adjusts a display position of the head shape image shown by the head shape data acquired by the head shape acquisition part 151 and a display position of the inner surface shape image generated by the inner surface shape input part 152. Specifically, the position adjustment part 153 adjusts the display positions of the head shape image and the inner surface shape image so that the head shape image and the inner surface shape image are overlapped on the display part 13.

Figure 6:
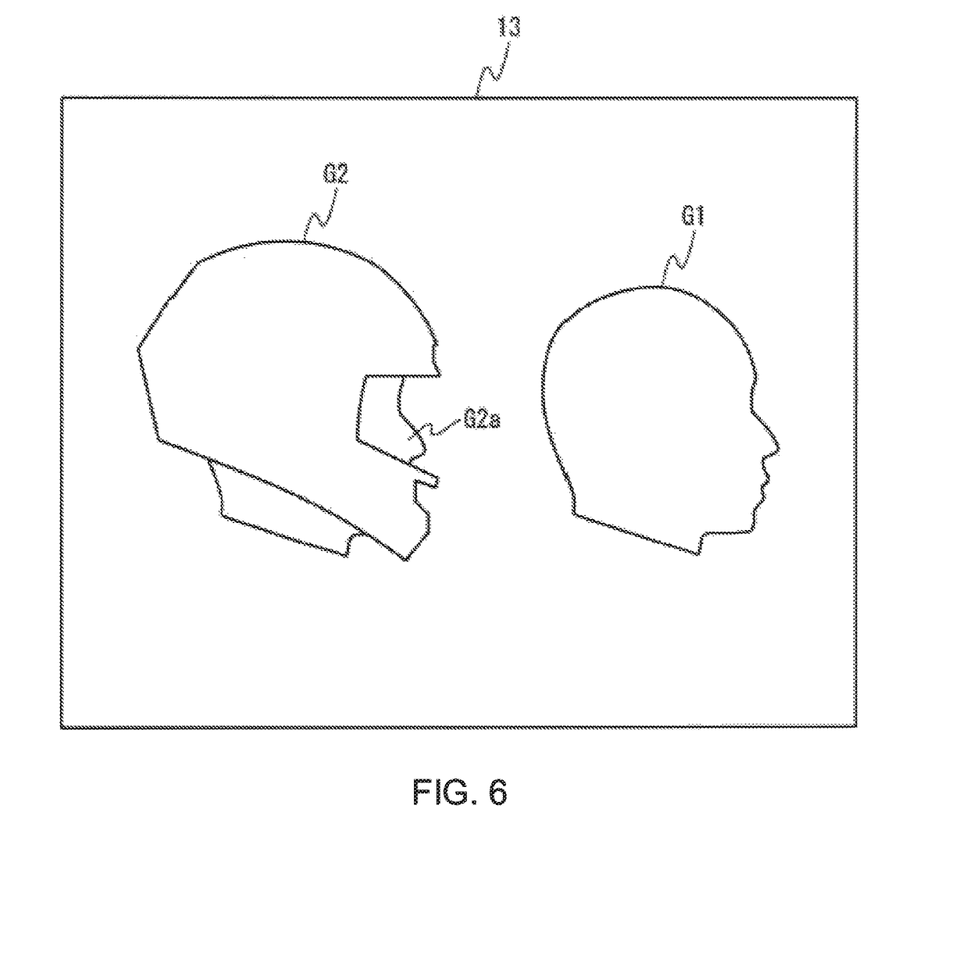
FIG. 6 is a diagram for describing an adjustment of display positions of a head shape image G1 and an inner surface shape image G2.

FIG. 6 is a diagram for describing an adjustment of display positions of a head shape image G1 and an inner surface shape image G2. Here, as shown in FIG. 6, the head shape image G1 and the inner surface shape image G2 are separately displayed. In this state, when the operator performs an input operation to make the head shape image G1 match with the inner surface shape image G2 using the operation unit 12, the display positions of the head shape image G1 and the inner surface shape image G2 are adjusted so that the head shape image G1 and the inner surface shape image G2 are overlapped. It should be noted that the inner surface shape image G2 includes a dummy image G2a assuming a wearer, and the operator performs an input operation to make the head shape image G1 match with the dummy image G2a. Further, the head shape image G1 and the inner surface shape image G2 are each displayed on the display part 13 in a rotatable manner. This makes it easier to overlap the head shape image G1 and the inner surface shape image G2 having three-dimensional shapes in three dimensions.

[Space Information Acquisition Part 154]

The space information acquisition part 154 acquires the space information showing the space between the wearer's head and the inner surface of the helmet 1 on the basis of the head shape data and the inner surface shape data. Specifically, when the operator performs an input operation for acquiring the space information, the space information acquisition part 154 acquires the space information between the wearer's head and the inner surface of the helmet 1 on the basis of the head shape image G1 and the inner surface shape image G2 that are overlapped by the position adjustment part 153.

The space information acquisition part 154 acquires the information regarding the space (gap) between the whole surface of the wearer's head and the whole helmet inner surface 1a as the space information. In this manner, the space between the whole surface of the head and the whole helmet inner surface 1a can be comprehended.

[Display Control Part 155]

The display control part 155 controls the display on the display part 13. In the present exemplary embodiment, the display control part 155 superimposes an additional image showing the space information acquired by the space information acquisition part 154 on i) the shape image showing the inner surface shape data (G2) or ii) the shape image showing the head shape data and the inner surface shape data (G1; G2), and displays the resulting image on the display part 13. Here, the display control part 155 displays an additional image on the display part 13 by superimposing it on the head shape image G1 and the inner surface shape image G2 that are in an overlapped state. In this manner, the operator can easily comprehend the space between the whole head of the wearer and each portion of the helmet inner surface 1a by viewing the shape image and the additional image displayed on the display part 13.

The display control part 155 displays an image in a form for distinguishing the size of the space between the helmet 1 and the whole surface of the wearer's head as an additional image. For example, the display control part 155 displays an image whose type of color and color shading are different according to the size of the space as an additional image. In this manner, the operator can easily comprehend the size of the space between the whole head of the wearer and each portion of the helmet inner surface 1a. The additional image is generated by the display control part 155 on the basis of the space information acquired by the space information acquisition part 154.

Figure 7:
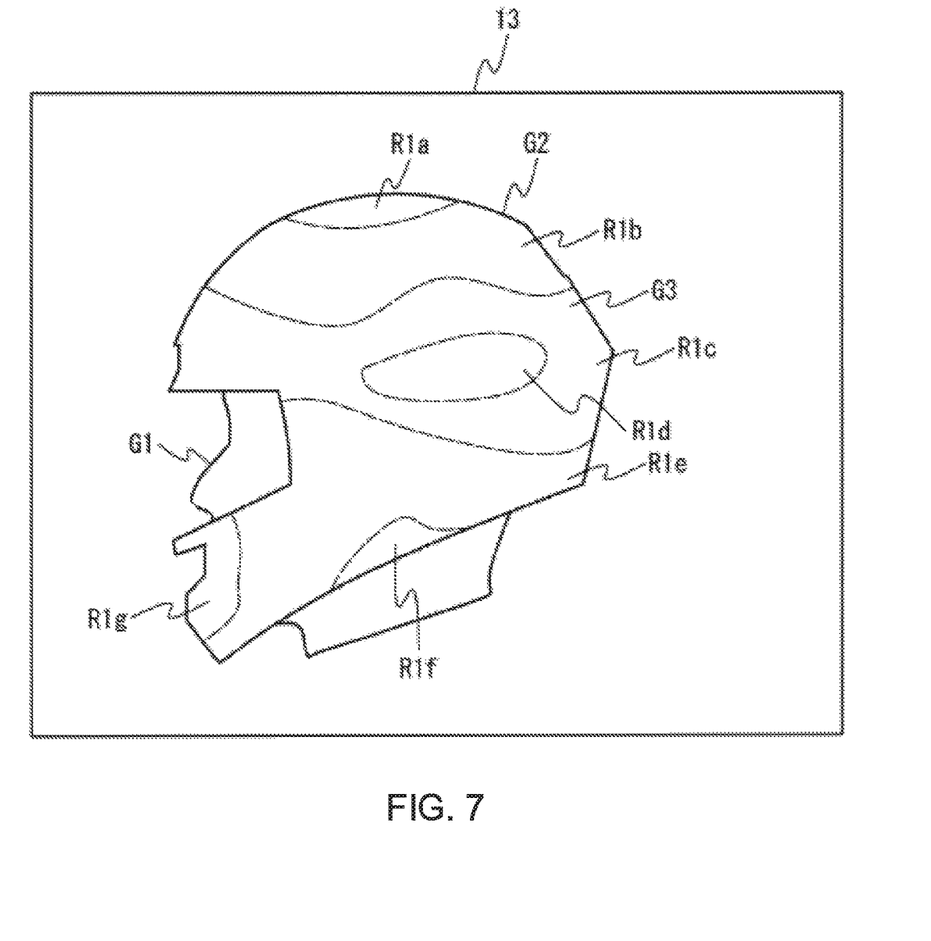
FIG. 7 is a schematic view for describing an example of a display form of an additional image.

FIG. 7 is a schematic view for describing an example of a display form of an additional image. In FIG. 7, an additional image G3, which is superimposed on the head shape image G1 and inner surface shape image G2 that are in an overlapped state, is displayed. Here, the additional image G3 is an image having the same size as the inner surface shape image G2, and is divided into a plurality of regions R1a to R1g. The regions R1a to R1g are divided in accordance with the size of the space between the head and the helmet 1. The regions R1a to R1g actually have different types of colors or different color shadings so that they are easily distinguished. That is, the display control part 155 displays the size of the space using color mapping. It should be noted that dashed lines shown in FIG. 7 are shown for the convenience of distinguishing the regions R1a to R1g, instead of coloring the regions R1 to R7.

Further, it should be noted that an image corresponding to a side surface of the helmet 1 is displayed in FIG. 7, but in a practical use, the display control unit 155 also displays the additional image on the side opposite to the portion shown in FIG. 7 when the head shape image G1 and the inner surface shape image G2 are rotated on the display part 13. In this manner, the operator can easily comprehend the space between the whole head of the wearer and each portion of the helmet inner surface 1a by rotating the image on the display part 13.

The display control part 155 displays an additional image on the display part 13 by superimposing it on an attachment site where an additional pad (for example, the pad 35a shown in FIG. 3 and the like) is attached in the helmet inner surface 1a. In this manner, the operator can easily comprehend the space in the attachment site where an additional pad is attached by viewing the additional image displayed on the display part 13. As a result, the operator can comprehend a thickness and a shape of the additional pad that is suitable for the space.

Figure 8:
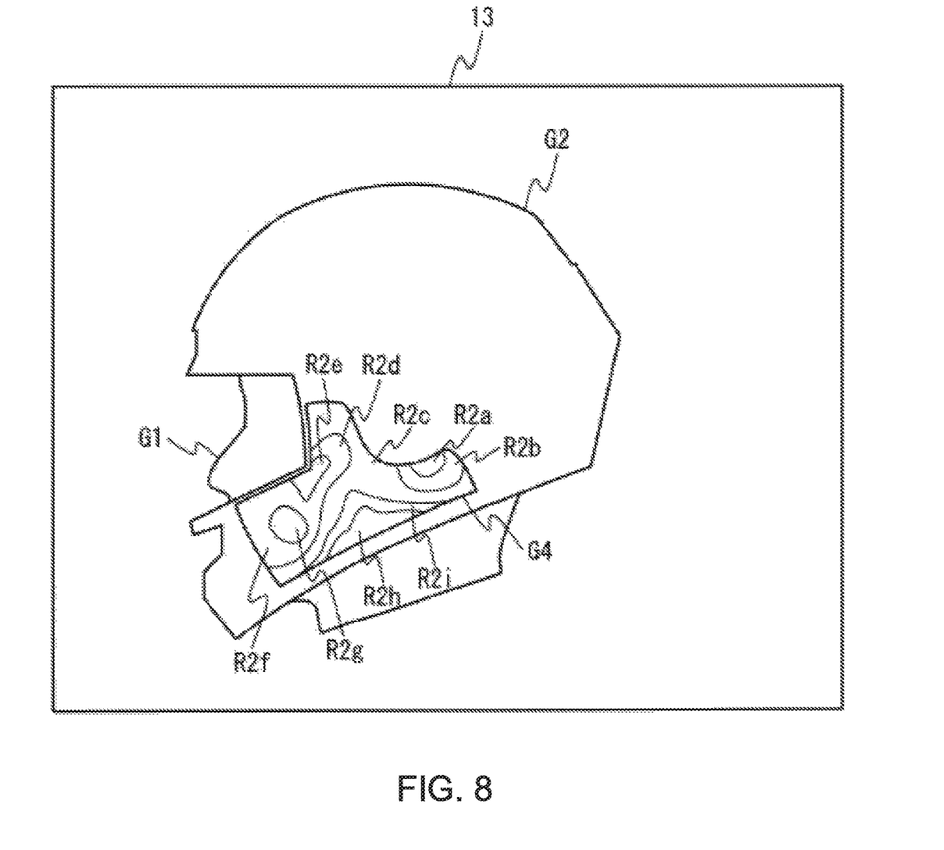
FIG. 8 is a schematic view for describing an example of a display form of an additional image superimposed on an attachment site.

FIG. 8 is a schematic view for describing an example of a display form of an additional image superimposed on an attachment site. FIG. 8 shows an additional image G4 that is superimposed on the attachment site of the side surface of the helmet 1. The additional image G4 includes border lines between a plurality of regions R2a to R2i and adjacent regions. When the space between a cheek of the wearer and the helmet inner surface $1a$ is divided into a plurality of ranges, the regions R2$a$ to R2$i$ are regions that each corresponds to one of the classified ranges. In each of the plurality of regions R2$a$ to R2$i$, the type of color and color shading are different. The border lines are lines that define adjacent regions and are shown by solid lines.

Figure 9:
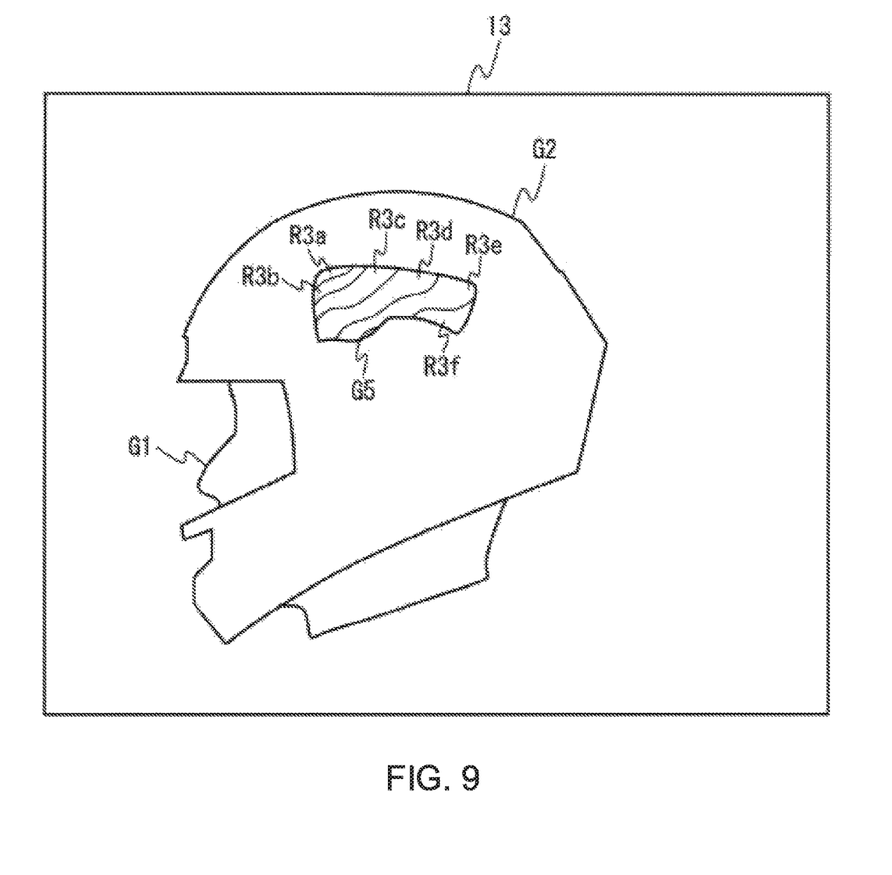
FIG. 9 is a schematic view for describing an example of a display form of an additional image superimposed on an attachment site.

FIG. 9 is a schematic view for describing an example of a display form of an additional image superimposed on an attachment site. FIG. 9 shows an additional image G5 that is superimposed on the attachment site of a parietal region side of the helmet 1. The additional image G5 is displayed in the same manner as the additional image G4 shown in FIG. 8. That is, the additional image G5 includes border lines between a plurality of regions R3$a$ to R3$f$ and adjacent regions. When the operator selects a desired attachment site using the control part 12, the display control part 155 displays an additional image to be superimposed on the selected attachment site.

It should be noted that, in the above description, the additional images G3 to G5 are displayed by being superimposed on the head shape image G1 and inner surface shape image G2 that are in an overlapped state, but it is not so limited. For example, as shown in FIG. 10, an additional image may be displayed by being superimposed on the inner surface shape image G2 displayed on the display part 13.

Figure 10:
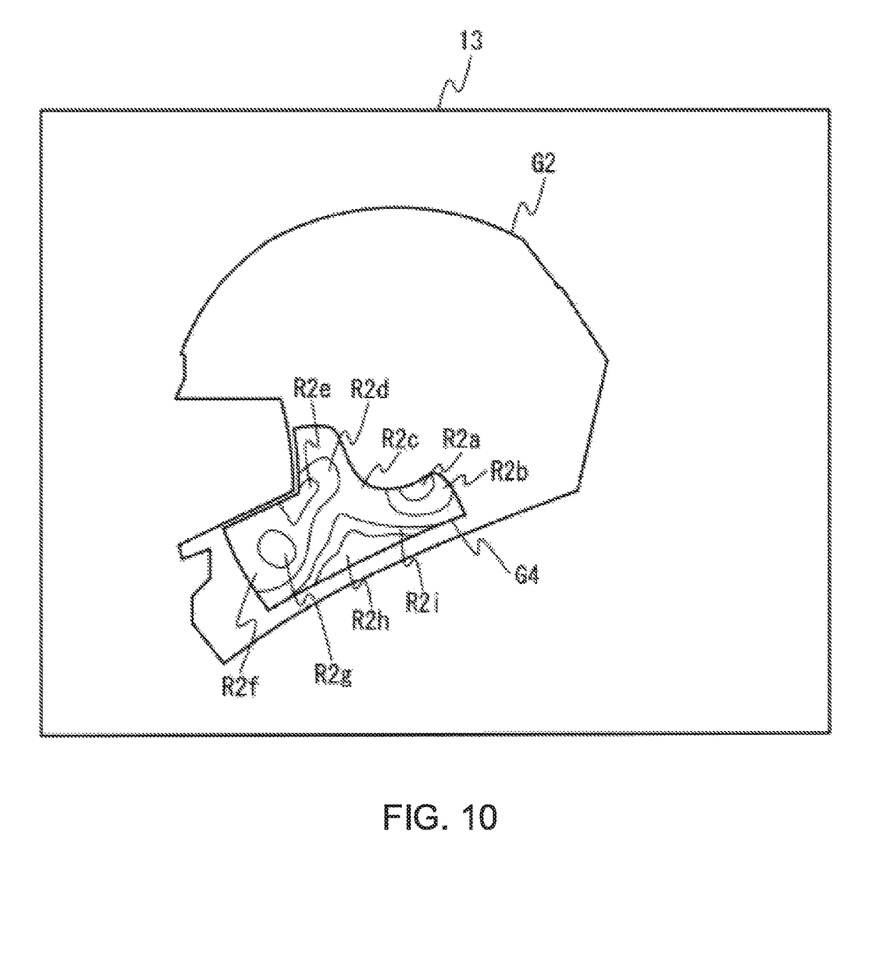
FIG. 10 is a schematic view for describing an example of a display form of an additional image superimposed on an attachment site.

FIG. 10 is a schematic view for describing an example of a display form of an additional image superimposed on an attachment site. In FIG. 10, the head shape image G1 is not displayed on the display part 13, and the additional image G4 is displayed by being superimposed on the attachment site where an additional pad is attached in the inner surface shape image G2.

Further, in the above description, the additional images are displayed one by one on the display unit 13 by being superimposed on the attachment site where the additional pad is attached, but it is not so limited and a plurality of additional images may be collectively displayed.

Furthermore, in the above description, the additional image is an image of a plurality of regions having different colors, but in addition to this, information showing the maximum value or the minimum value of the space between the head and the helmet inner surface $1a$ may also be included. In such a case, it is possible to comprehend the size of the space (gap) by a numerical value.

According to the above-described information processing apparatus 10 for adjusting the comfort level of a helmet, an additional image showing the space information obtained from the head shape data and the inner surface shape data is displayed on the display part 13 by being superimposed on the head shape image G1 and the inner surface shape image G2. In this manner, the operator or the like who adjusts the comfort level of the helmet 1 can easily comprehend the space (gap) between the whole head and the helmet inner surface $1a$ with high accuracy by viewing the additional image displayed on the display part 13. As a result, it is easier to take further measures later for filling the space such as selecting additional pads.

<3. Method for Specifying and Creating a Form of Additional Pad>

A method for specifying and creating a form of an additional pad to be attached to the helmet 1 will be described below.

First, the operator specifies a form of an additional pad to be attached to the helmet 1 on the basis of the additional image displayed on the display part 13. For example, the operator specifies a thickness and a shape of the additional pad on the basis of the additional image of the additional pad that is superimposed on the attachment site.

In the present exemplary embodiment, an additional pad with a predetermined thickness and a reference shape is attached by placing it on the attachment site of the helmet 1. Upon doing this, the operator specifies a number of the additional pads to be layered up and a cutting shape to be cut from the reference shape of the additional pad on the basis of the additional image displayed on the display part 13, and adjusts the form of the additional pad to be attached. For example, the operator specifies the cutting shape that is cut from the reference shape on the basis of a plurality of regions (for example, the regions R3$a$ to R3$f$ in the additional image G5 shown in FIG. 9) and the border lines in the additional image. In such a case, the cutting shape can be specified on the basis of the border lines, and so the cutting shape can be easily specified.

Figure 11:
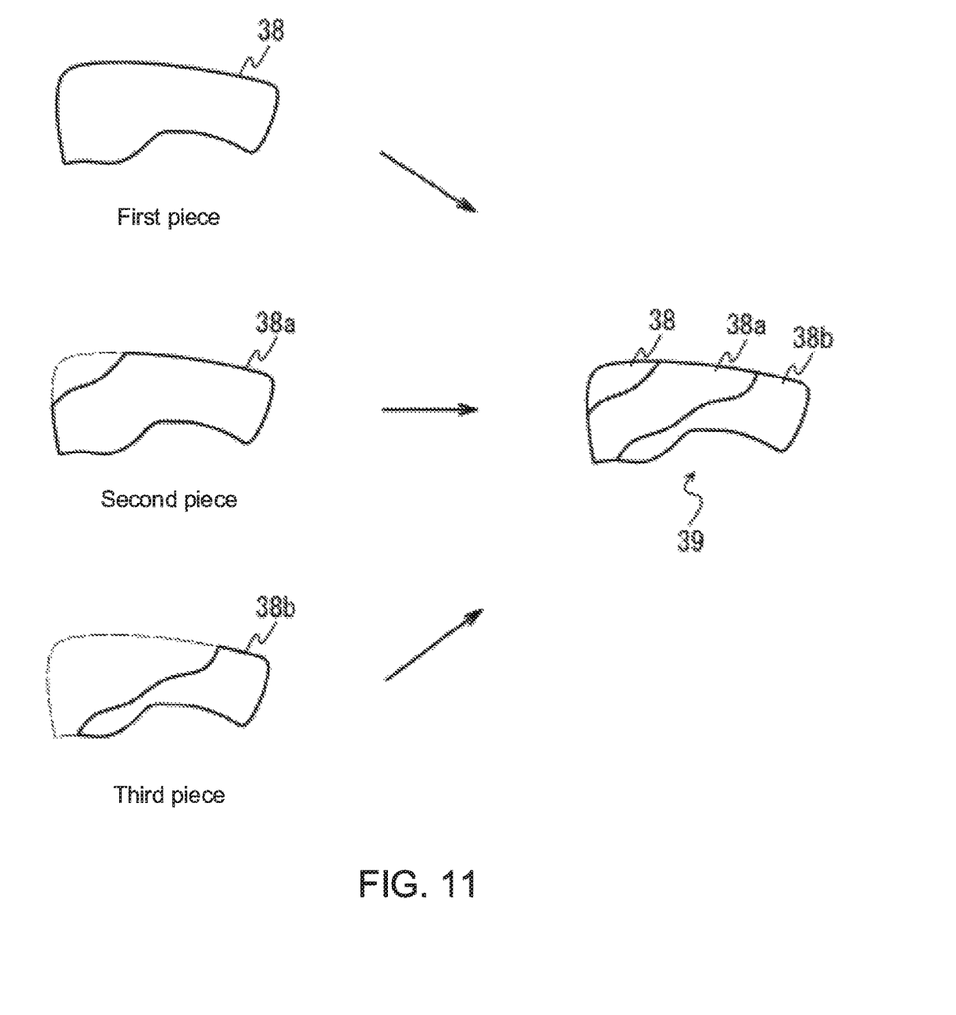
FIG. 11 is a diagram for describing a method for creating an additional pad.

FIG. 11 is a diagram for describing a method for creating the additional pad. Here, three pieces of additional pads 38, 38$a$, and 38$b$ are layered on the basis of the additional image G5 shown in FIG. 9. The first additional pad 38 has the same shape as the reference shape. On the other hand, the second additional pad 38$a$ and the third additional pad 38$b$ are cut from the reference shape along the border lines of the additional image G5. The operator layers the cut second additional pad 38$a$ and the third additional pad 38$b$ onto the first additional pad 38. In this way, the additional pad 39 having a complicated three-dimensional shape to be attached to the attachment site can easily be created with the additional pads prepared in advance.

Further, the operator attaches the additional pad whose form was specified on the basis of the additional image to the predetermined attachment site in the helmet inner surface $1a$. That is, the operator attaches the created additional pad 39 shown in FIG. 11 to the attachment site in the helmet inner surface $1a$. In this manner, the additional pad 39 can be attached to the attachment site to fill the space between the wearer's head and the helmet 1.

It should be noted that, in the above description, the operator cuts the additional pad from the reference shape, but it is not so limited. For example, the additional pad may be molded by a molding device on the basis of data of the additional image. This eliminates the necessity of a cutting work and the additional pad can be speedily created.

<4. A Flow of an Adjustment of the Comfort Level of a Helmet>

A specific flow of an adjustment of the comfort level of the helmet 1 is described with reference to FIG. 12.

Figure 12:
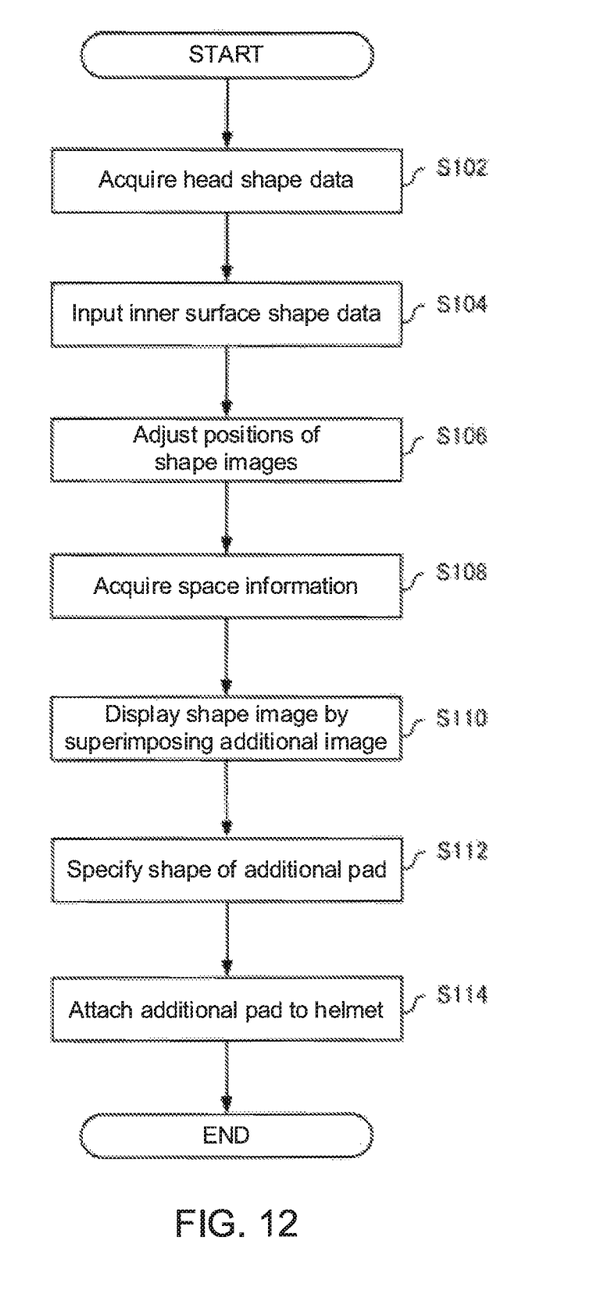
FIG. 12 is a flowchart showing an example of a flow of adjusting the comfort level of the helmet 1.

FIG. 12 is a flowchart showing an example of a flow of adjusting the comfort level of the helmet 1. First, the head shape acquisition part 151 acquires head shape data obtained by measuring the three-dimensional shape of the wearer's head of the helmet 1 (step S102). Specifically, the head shape acquisition part 151 acquires the head shape data that is measured data obtained by the measurement device 20 measuring the three-dimensional shape of the head of the wearer U as shown in FIG. 5.

Next, the inner surface shape data showing the three-dimensional shape of the helmet inner surface $1a$ is inputted to the inner surface shape input part 152 (step S104). Specifically, similarly to the head shape data, the inner surface shape data obtained by the measurement device 20 measuring the three-dimensional shape of the inner surface of the helmet 1 is inputted to the inner surface shape input part 152.

Then, the position adjustment part 153 adjusts the display positions of the head shape image and the inner surface shape image so that the head shape image and the inner surface shape image are overlapped on the display part 13 (step S106). For example, when the operator performs an operation such that the head shape image G1 and the inner surface shape image G2 are overlapped on a screen of the display part 13 as shown in FIG. 6, the position adjustment part 153 adjusts the display positions of the head shape image G1 and the inner surface shape image G2 (see FIG. 7).

After that, the space information acquisition part 154 acquires the space information showing the space between the head and the inner surface of the helmet 1 on the basis of the head shape data and the inner surface shape data (step S108). For example, when the operator performs an input operation for acquiring the space information, the space information acquisition part 154 acquires information regarding the space (gap) between the whole surface of the head and the whole inner surface of the helmet 1 on the basis of the head shape image G1 and the inner surface shape image G2 that are in an overlapped state.

Subsequently, the display control part 155 displays an additional image showing the space information on the display part 13 by superimposing it on the head shape image G1 and the inner surface shape image G2 (step S110). Specifically, the display control part 155 generates the additional images from the space information and displays the additional images G3 to G5 by superimposing them on the inner surface shape image G2 as shown in FIGS. 7 to 10. The operator can easily comprehend the space between the wearer's head and the helmet inner surface 1a by viewing the additional images G3 to G5.

Next, the operator specifies the form of the additional pad to be attached to the inner surface of the helmet 1 on the basis of the additional image displayed on the display part 13 (step S112). For example, the operator specifies the forms of the additional pads by referencing the additional images G4 and G5 that are superimposed and displayed on the attachment sites where the additional pads are attached as shown in FIGS. 8 to 10. In this manner, the operator can specify a number of the additional pads to be layered and a cutting shape to be cut from the reference shape of the additional pad.

For the next step, the operator attaches the additional pad corresponding to the form specified in the step S112 to the predetermined attachment site in the inner surface of the helmet 1 (step S114). For example, the operator creates the additional pad 39 by layering the cut second additional pad 38a and third additional pad 38b onto the first additional pad 38 with the reference shape. And then, the operator attaches the created additional pad 39 to the attachment site of the helmet inner surface 1a.

According to the above-described exemplary embodiment, the operator can specify a suitable form (a thickness and a shape) of the additional pad on the basis of the additional image (specifically, the additional image that is superimposed on the attachment site of the additional pad) displayed on the display part 13. In this manner, even when the shape of the wearer's head is uneven, the space between the head and the helmet 1 can be appropriately filled.

It should be noted that, in the above description, the thickness and the shape of the additional pad are specified on the basis of the additional image, but it is not so limited. For example, the thickness and the shape of the center pad may be specified in addition to the additional pad on the basis of the additional image.

Further, in the above description, the helmet 1 is a full-face-type helmet worn by a rider of a motorcycle, but it is not so limited. For example, the helmet 1 may be a bicycle helmet.

The present invention is explained with the exemplary embodiments of the present invention but the technical scope of the present invention is not limited to the scope described in the above embodiment. It is apparent for those skilled in the art that it is possible to make various changes and modifications to the embodiment. It is apparent from the description of the scope of the claims that the forms added with such changes and modifications are included in the technical scope of the present invention.

What is claimed is:

1. A method for adjusting a comfort level of a helmet, the method comprising the steps of:
    acquiring head shape data by measuring a three-dimensional shape of a head of a wearer of a helmet;
    inputting inner surface shape data showing a three-dimensional shape of a helmet inner surface;
    acquiring space information showing a space between the wearer's head and the helmet inner surface on the basis of the head shape data and the inner surface shape data; and
    displaying additional images showing the space information on a display part by superimposing the additional images on i) a shape image showing the inner surface shape data or ii) the shape image showing the head shape data and the inner surface shape data, wherein
    the displaying step displays, as the additional images, a contour shape of a first pad to be attached to the helmet inner surface and border lines indicating an attachment site for each pad of a plurality of layered pads to be superimposed over the first pad in the shape image, in which the border lines divide an inside of the contour shape into a plurality of regions corresponding to the plurality of layered pads according to a size of the space.

2. The method for adjusting the comfort level of the helmet according to claim 1, the method further comprising the steps of:
    specifying a form of a pad to be added to the helmet inner surface on the basis of the additional image displayed on the display part; and
    attaching a pad corresponding to the form that is specified in the specifying step to a predetermined attachment site in the helmet inner surface.

3. The method for adjusting the comfort level of the helmet according to claim 2, wherein
    the pad to be attached to the helmet inner surface is previously determined for each attachment site of the helmet inner surface , and
    the specifying step specifies the number of the pads to be layered having a predetermined thickness and a cutting shape to be cut from the pad with a reference shape for each attachment site.

4. The method for adjusting the comfort level of the helmet according to claim 1, wherein
    the specifying step specifies a cutting shape to be cut from the pad with a reference shape on the basis of the contour shape and the border line.

5. The method for adjusting the comfort level of the helmet according to claim 1, wherein
    the displaying step displays an image in a form for distinguishing the size of the space with respect to the whole surface of the head as the additional image.

6. The method for adjusting the comfort level of the helmet according to claim 5, wherein the displaying step displays an image as the additional image by making at least one of the type of color and color shading different according to the size of the space.

7. The method for adjusting the comfort level of the helmet according to claim 1, the method further comprising the steps of:

adjusting display positions of the head shape image and the inner surface shape image so that the head shape image shown by the head shape data and the inner surface shape image shown by the inner surface shape data are overlapped on the display part, wherein the space information acquisition step acquires the space information on the basis of i) the inner surface shape image or ii) the head shape image and the inner surface shape image whose display positions are adjusted in the position adjustment step.

8. The method for adjusting the comfort level of the helmet according to claim 1, wherein the inner surface shape input step inputs inner surface shape data obtained by a measurement device measuring the three-dimensional shape of the inner surface of the helmet, the measuring device measuring the three-dimensional shape of the wearer's head.

9. An information processing apparatus for adjusting a comfort level of a helmet comprising:

a storage that stores head shape data showing a three-dimensional shape of a head of a wearer of a helmet and inner surface shape data showing a three-dimensional shape of a helmet inner surface, the head shape data and the inner surface shape data being measured by a measurement device; and a processor that acquires space information showing a space between the wearer's head and the helmet inner surface on the basis of the head shape data and the inner surface shape data stored in the storage and displays additional images showing the space information on a display part by superposing the additional images on i) the shape image showing the inner surface shape data or ii) the shape image showing the head shape data and the inner surface shape data, wherein the processor is configured to control a display to display, as the additional images, a contour shape of a first pad to be attached to the helmet inner surface and border lines indicating an attachment site for each pad of a plurality of layered pads to be superimposed over the first pad in the shape image, in which the border lines divide an inside of the contour shape into a plurality of regions corresponding to the plurality of layered pads according to a size of the space.

10. The information processing apparatus for adjusting the comfort level of the helmet according to claim 9, wherein the processor displays an image as the additional image in a form for distinguishing the size of the space with respect to the whole surface of the wearer's head.

11. The information processing apparatus for adjusting the comfort level of the helmet according to claim 10, wherein the processor displays an image of which at least one of a type of color and color shading are made different according to the size of the space as the additional image.

12. The information processing apparatus for adjusting the comfort level of the helmet according to claim 9, wherein the processor adjusts display positions of the head shape image and the inner surface shape image so that the head shape image shown by the head shape data and the inner surface shape image shown by the inner surface shape data are overlapped on the display part and acquires the space information on the basis of i) the shape image showing the inner surface shape data or ii) the shape image showing the head shape data and the inner surface shape data whose display positions are adjusted.

\* \* \* \* \*